US007550716B2

(12) United States Patent
Furuhashi et al.

(10) Patent No.: US 7,550,716 B2
(45) Date of Patent: Jun. 23, 2009

(54) MASS SPECTROMETER

(75) Inventors: Osamu Furuhashi, Kyoto (JP); Kiyoshi Ogawa, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 228 days.

(21) Appl. No.: 11/581,574

(22) Filed: Oct. 17, 2006

(65) Prior Publication Data

US 2007/0085000 A1 Apr. 19, 2007

(30) Foreign Application Priority Data

Oct. 18, 2005 (JP) ............................. 2005-303162

(51) Int. Cl.
*B01D 59/44* (2006.01)
*H01J 49/00* (2006.01)

(52) U.S. Cl. ....................... 250/281; 250/282; 250/288; 250/492.21; 73/864.22; 73/864.21; 422/64; 422/70; 436/86

(58) Field of Classification Search ................. 250/288, 250/282, 492.21, 281; 73/864.22, 864.21; 422/64, 70; 436/86
See application file for complete search history.

(56) References Cited

U.S. PATENT DOCUMENTS 4,234,791 A 11/1980 Enke et al.
5,202,563 A 4/1993 Cotter et al.
5,581,081 A * 12/1996 Kato et al. .................. 250/288
7,186,992 B2 * 3/2007 Nickel .................. 250/492.21

FOREIGN PATENT DOCUMENTS

JP 2002-184349 A 6/2002

OTHER PUBLICATIONS

Yasuo Shida et al., "Korenara Wakaru Masu-Supekutorometorii (For Learners of Mass Spectrometry)" Kagaku-dojin Publishing Company, cited in specification of U.S. Appl. No. 11/581,574.

* cited by examiner

*Primary Examiner*—Jack I Berman
*Assistant Examiner*—Meenakshi S Sahu
(74) *Attorney, Agent, or Firm*—Westerman, Hattori, Daniels & Adrian, LLP.

(57) ABSTRACT

The present invention provides a mass spectrometer capable of breaking even a sample molecule having a large molecular weight by a CID process. In an embodiment of the present invention, the mass spectrometer includes an ionizing source 10 for turning a sample into ions, mass-separating sections 40 and 60 for mass-separating the sample ions, a detecting section 20 for detecting the mass-separated ions, and a collision section (collision cell) 51 located on an ion path extending from the ionizing source 10 through the mass-separating sections 40 and 60 to the detecting section 20. It also includes a cluster generator 30 for producing clusters of atoms or molecules. The clusters produced by the cluster generator 30 are introduced into the collision cell 51. The use of the clusters having a huge mass as the target gas in the CID process enables the collision energy of the sample ions to be efficiently assigned to the breaking of the ions.

10 Claims, 2 Drawing Sheets

MASS SPECTROMETER

The present invention relates to a mass spectrometer. More specifically, it relates to a mass spectrometer capable of dissociating sample ions having large molecular weight into fragments and performing the mass analyses of those resultant ions.

BACKGROUND OF THE INVENTION

One of the known methods for obtaining structural information about the molecular ions by mass spectrometry is an MS/MS analysis (or $MS^n$ analysis). In a typical MS/MS analysis, an ion having a desired mass-to-charge ratio is first separated from the material to be analyzed. This ion is called the precursor ion, or the parent ion. Next, the precursor ion thus separated is broken into fragment ions by a collision-induced dissociation (CID) process. Finally, the fragment ions (or daughter ions) produced by the dissociation process, are mass-analyzed to obtain a mass spectrum, which provides information about the molecular structure of the precursor ion.

In the CID process, the sample ion collides with a gas (called the target gas) within a collision section, whereby the collision energy breaks the sample ion into smaller ions. Some of the devices for the MS/MS (or $MS^n$) analysis include multiple mass separators connected in series, and some others use an ion trap for capturing and breaking a specific ion. In the former type, a collision cell is located between the two neighboring mass separators as the collision section, whereas, in the latter type, the ion trap having an inner ion-trapping space serves as the collision section (see Patent Documents 1 and 2). If a time-of-flight mass spectrometer is used, the collision section may be located at a specific section of the flight tube (see Patent Document 3).

If a collision cell is provided as the collision section, the target gas is introduced into the collision cell and a precursor ion is supplied into the same cell. Then, the precursor ion passing through the collision cell collides with the target gas, and the precursor ion is broken into fragment ions. If an ion trap is used as the collision section, the target gas is introduced into the ion trap, in which the target gas collides with the precursor ions having a specific range of mass-to-charge ratios being gathered at the center by an electric field created within the ion trap. Thus, the ions are broken into fragment ions. If a section of the flight tube is used as the collision section, the target gas collides with the precursor ion when the ion passes through the collision section, thereby breaking the precursor ion into fragment ions.

[Patent Document 1] U.S. Pat. No. 4,234,791

[Patent Document 2] Unexamined Japanese Patent Publication No. 2002-184349

[Patent Document 3] U.S. Pat. No. 5,202,563

[Non-Patent Document 1] Yasuo SHIDA, et al., *Korenara Wakaru Masu-Supekutorometorii* (For Learners of Mass Spectrometry), Kagaku-dojin Publishing Company, Kyoto, 2001, pp. 46-51

In general, a mass spectrometer using a conventional CID process to break the precursor ion uses argon, helium or some other inert gas atom as the target gas to be introduced into the collision section (see Non-Patent Document 1). However, since the mass of the inert gas atom is small, the CID process using the inert gas cannot break a large molecule having a molecular weight of about 5000 Da or larger. This means that the conventional method cannot provide information about the structure of such a large molecule.

Accordingly, the main objective of the present invention is to provide a mass spectrometer capable of dissociating even precursor ions having a large molecular weight by the CID process.

SUMMARY OF THE INVENTION

Thus, the mass spectrometer according to the present invention includes:

an ionizing section for turning a sample into ions;

a mass-separating section for mass-separating the sample ions with respect to their mass-to-charge ratio;

a detecting section for detecting the mass-separated ions;

a collision section provided on the ion path extending from the ionizing section through the mass-separating section to the detecting section;

a cluster generator for producing clusters of atoms or molecules; and a cluster introducer for introducing the clusters into the collision section.

A cluster is a mass of plural atoms or molecules bonded by a weak force. A preferable example is an inert gas cluster consisting of a mass of argon or some other inert gas atom. In principle, however, in the present invention any kind of cluster can be used.

A preferable example of the cluster generator is a commonly known cluster-generating device that produces clusters by adiabatic expansion of gaseous atoms and molecules.

The collision section in the present invention serves as a space in which ions are broken by a CID process. It can be similar to any type of space used as the collision section in conventional mass spectrometers. For example, a type of conventional mass spectrometer, known as the "tandem-in-space mass spectrometer," has multiple mass separators connected in series, in which a collision cell for causing a collision between the precursor ions and the target gas is provided in a space between the mass separators. To apply the present invention to this type of mass spectrometer, the collision cell can be used as the collision section in the present invention, with a cluster generator and a cluster introducer newly added so as to introduce clusters into the collision cell. Another type of mass spectrometer, called the "tandem-in-time mass spectrometer," performs the MS/MS or MSnanalysis with a single mass separator, such as the ion trap. This type of mass spectrometer usually introduces the target gas into the inner space of the ion trap so that the target gas can collide with the ions captured within the ion trap and break each ion into fragment ions. To apply the present invention to this type of mass spectrometer, the ion trap can be used as the collision section in the present invention, with a cluster generator and a cluster introducer newly added so as to introduce clusters into the ion trap.

Having the construction described thus far, the mass spectrometer according to the present invention uses a cluster of, or a congregation of, atoms or molecules, as the target gas in the CID process. Here, a cluster used in the present invention can be constituted by atoms or molecules of the same species, or of various species. The increase in energy deposition for precursor ion with increasing target mass is well known for CID process, which is used for tandem mass spectrometry. The mass of a cluster is much larger than that of a single atom or molecule of any conventional target gas, so that the kinetic energy of the sample ion injected into the collision section is efficiently assigned to the breaking of the ion. This increase in the excitation energy makes it possible to break a relatively large molecule that could not be broken by the CID process of the conventional mass spectrometers and thus to obtain information about its structure.

In general, the bonding energies of clusters are much lower than the normal chemical bonding energies, so that the collision with the sample ion breaks the cluster into atoms and molecules having small masses. Therefore, the particles originating from the cluster have a negligible undesirable effect on the spectrum of the fragment ions originating from the precursor ion.

EXPLANATION OF NUMERALS

10 . . . Ion Source
20 . . . Detector
30 . . . Cluster Generator
31 . . . Gas Supplier
32 . . . Skimmer
40 . . . First Quadrupole Mass Filter
50 . . . Second Quadrupole Mass Filter
51 . . . Collision Cell
52 . . . Cluster Introduction Hole
60 . . . Third Quadrupole Mass Filter
70 . . . Ion Trap
71 . . . Ring Electrode
72, 73 . . . End Cap Electrodes
74 . . . Ion-Capturing Space
75 . . . Cluster Introduction Hole
80 . . . Time-Of-Flight Mass Spectrometer (TOFMS)
81 . . . Flight Space

DETAILED DESCRIPTION OF PREFERRED EMBODIMENTS

First Embodiment

Figure 1:
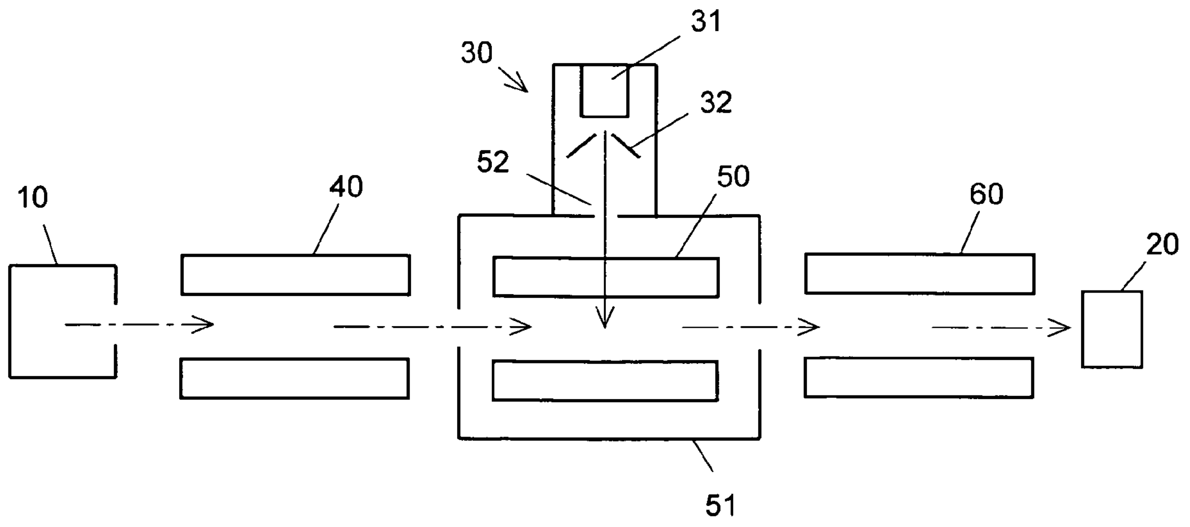
FIG. 1 is a schematic diagram of a tandem-in-space mass spectrometer according to the first embodiment of the present invention.

FIG. 1 schematically shows an example of the construction of the present invention applied to a tandem-in-space mass spectrometer having multiple mass separators connected in series. The mass spectrometer of the present embodiment is an MS/MS mass spectrometer using quadrupole mass filters as the mass separators. It includes an ion source 10, three sets of quadrupole mass filters (the first quadrupole mass filter 40, the second quadrupole mass filter 50, and the third quadrupole mass filter 60) and a detector 20, all of which are located within a vacuum chamber (not shown). The mass spectrometer also has a collision cell 51 enclosing the second quadrupole mass filter 50. The operation of each element is controlled by a controller (not shown) consisting of a central processing unit (CPU) and other devices.

The collision cell 51 is equipped with a cluster generator 30, which produces a strong cluster beam by performing an adiabatic expansion process to cool a gas of atoms or molecules supplied from the gas supplier 31 and extracting a beam of the gas with the skimmer 32. The cluster beam thus produced is introduced through the cluster introduction hole 52 into the collision cell 51.

Various kinds of ions released from the ion source 10 are initially introduced into the first quadrupole filter 40, which allows only the ions having a desired mass-to-charge ratio to pass through it. This step is called the "precursor selection" hereinafter. Then, the ion thus selected as the precursor is introduced into the second quadrupole filter 50 enclosed within the collision cell 51. Within this cell, the precursor ion collides with the clusters of the atoms or molecules (e.g. argon clusters) produced by the cluster generator 30 and supplied into the collision cell 51. As a result, the ion is broken into fragment ions. These ions then enter the third quadrupole filter 60. The mass spectrum of the fragment ions is obtained by scanning the voltage applied to the third quadrupole filter 60.

Second Embodiment

Figure 2:
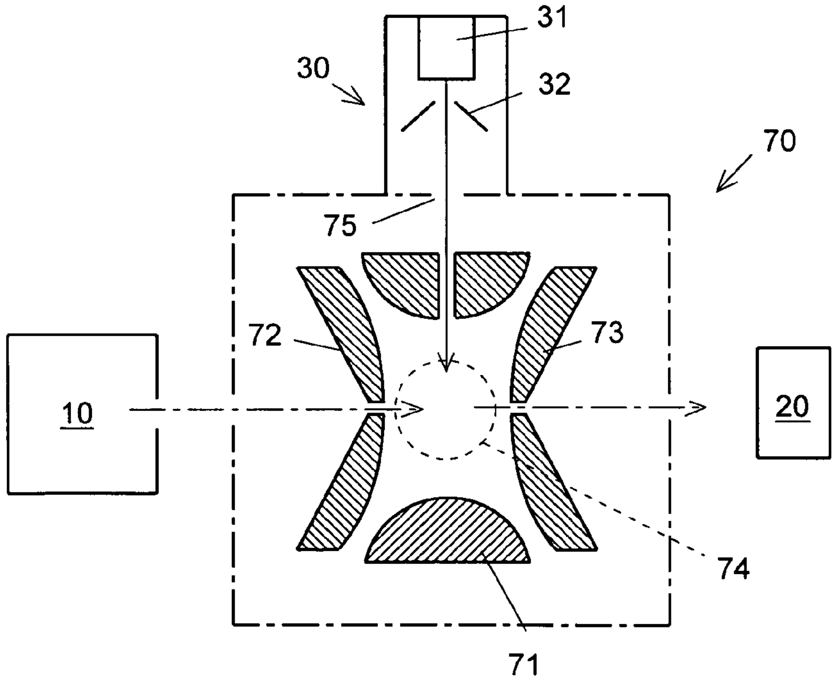
FIG. 2 is a schematic diagram of a tandem-in-time mass spectrometer according to the second embodiment of the present invention.

FIG. 2 schematically shows an example of the construction of the present invention applied to a tandem-in-time mass spectrometer for capturing, breaking and mass-analyzing the ion with a single mass spectrometer. The tandem-in-time mass spectrometer according to the present invention uses an ion trap as the aforementioned mass separator, including the ion source 10, an ion trap 70, the detector 20 and the cluster generator 30, all of which are located within a vacuum chamber (not shown). The ion trap 70 consists of a ring electrode 71 and a pair of end cap electrodes 72 and 73 facing each other across the ring electrode 71. A radio-frequency high voltage is applied to the ring electrode 71 to create a quadrupole electric field within the space surrounded by the ring electrode 71 and the two end cap electrodes 72 and 73. This space, in which ions are to be captured, is called the ion-capturing space 74 hereinafter. Meanwhile, an auxiliary alternating voltage is applied to the end cap electrodes 72 and 73 according to the analysis mode at the moment. The cluster generator 30 supplies clusters into the ion trap 70 in order to cause the dissociation of the ions captured within the ion-capturing space 74. The ion source 10, the ion trap 70, the detector 20, the cluster generator 30 and other elements are operated by a controller (not shown).

In the present mass spectrometer having the above-described construction, the ion source 10 turns the sample into ions, which are then introduced into the inner space of the ion trap 70. The ion trap 70 performs a precursor selection process by creating an appropriate electric field with the ring electrode 71 and the two end cap electrodes 72 and 73. As a result, the target ion is captured into the ion-capturing space 74. Then, the clusters produced by the cluster generator 30 are injected into the ion-capturing space 74, while accelerating the precursor ions by resonance excitation to make it collide with the clusters and turn into fragment ions. Then, the fragment ions are mass-separated by the ion trap 70 and detected by the detector 20.

Third Embodiment

Figure 3:
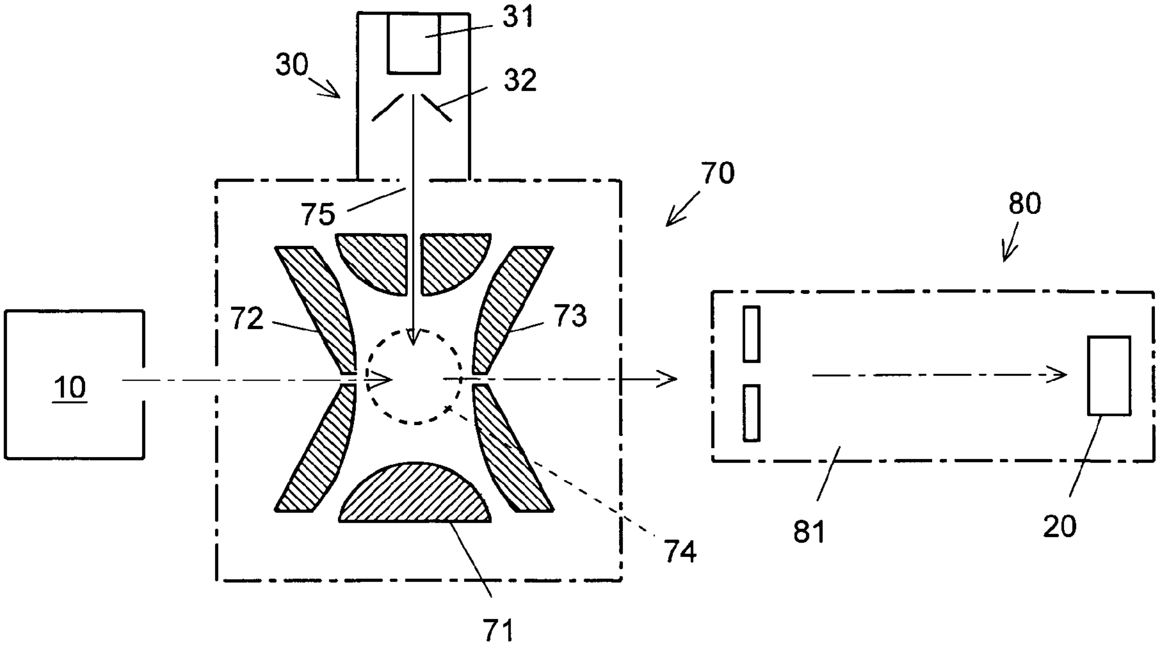
FIG. 3 is a schematic diagram of another tandem-in-space mass spectrometer according to the third embodiment of the present invention.

FIG. 3 schematically shows another example of the construction of the present invention applied to a tandem-in-space mass spectrometer. In the present embodiment, the tandem-in-space mass spectrometer includes the ion trap 70 as the first mass separator and a time-of-flight mass spectrometer (TOFMS) 80 as the second mass separator. The ion source 10, the ion trap 70 and the TOFMS 80 are located within a vacuum chamber (not shown). The ion trap 70 is equipped with the cluster generator 30. These elements are operated by a controller (not shown).

A sample ion released from the ion source 10 is initially introduced into the ion trap 70, which performs the precursor selection process to trap a desired ion. Meanwhile, the cluster generator 30 supplies clusters into the ion-capturing space 74, where the CID process is performed to break the sample ion into fragment ions, as explained thus far. After an adequately long period of time for the dissociation process, the voltages applied to the electrodes 71, 72 and 73 are changed in order to create an electric field that expels the ions from the ion trap 70 towards TOFMS 80. After exiting the ion trap 70, each ion travels through the flight space 81 of the TOFMS 80 and reaches the detector 20 after a certain flight time determined by its mass-to-charge ratio. Thus, the tandem-in-space mass spectrometer of the present embodiment captures and breaks the sample ion with the ion trap mass separator and performs the mass analysis of the fragment ion with the TOFMS. This construction enables the analysis to proceed with a high resolution and at a high processing efficiency.

As described thus far, the mass spectrometers of the above three embodiments uses clusters as the target gas in the CID process. Since the mass of a cluster is much larger than that of an inert gas atom or other conventionally used materials, the collision energy of the sample ion is efficiently assigned to the breaking of the ion. The present CID process can break a sample molecule having a molecular weight of 5000 Da or larger, which was difficult to break with conventional mass spectrometers. Constructing the mass spectrum of the fragment ions thus created will make it possible to obtain information about the structure of the sample molecule.

It should be noted that the present invention can be embodied in various forms within its spirit and scope, in addition to the preferred embodiments described thus far. For example, the present invention may be applied to a tandem-in-space mass spectrometer having three or more mass separators connected in series. Furthermore, the present invention may use different types of mass spectrometers instead of the mass filters or mass separators used in the above embodiments.

What is claimed is:

1. A mass spectrometer, comprising:

an ionizing section for turning a sample into ions;

a mass-separating section for mass-separating the sample ions with respect to their mass-to-charge ratio;

a detecting section for detecting the mass-separated ions;

a collision section provided on the ion path extending from the ionizing section through the mass-separating section to the detecting section;

a cluster generator for producing clusters of atoms or molecules; and a cluster introducer for introducing the clusters into the collision section in order to dissociate the sample ion into smaller ions in the CID process.

2. The mass spectrometer according to claim 1, where the cluster generator produces the clusters by adiabatic expansion of gaseous atoms or molecules.

3. The mass spectrometer according to claim 1, where said atoms or molecules are of an inert gas.

4. The mass spectrometer according to claim 2, where said atoms or molecules are of an inert gas.

5. The mass spectrometer according to claim 1, where the collision section is a collision cell.

6. The mass spectrometer according to claim 2, where the collision section is a collision cell.

7. The mass spectrometer according to claim 3, where the collision section is a collision cell.

8. The mass spectrometer according to claim 1, where the collision section is an ion trap.

9. The mass spectrometer according to claim 2, where the collision section is an ion trap.

10. The mass spectrometer according to claim 3, where the collision section is an ion trap.

* * * * *